(12) United States Patent
Sung et al.

(10) Patent No.: US 7,233,893 B2
(45) Date of Patent: Jun. 19, 2007

(54) METHOD AND APPARATUS FOR TRANSMITTING WIDEBAND SPEECH SIGNALS

(76) Inventors: Ho-sang Sung, 102-908 Chowon Apt., Mannyeon-dong, Seo-gu, Daejon (KR); Dae-hwan Hwang, 103-905 Narae Apt., Jeonmin-dong, Yusong-gu, Daejon (KR)

( * ) Notice: Subject to any disclaimer, the term of this patent is extended or adjusted under 35 U.S.C. 154(b) by 753 days.

(21) Appl. No.: 10/222,662

(22) Filed: Aug. 16, 2002

(65) Prior Publication Data

US 2003/0115044 A1    Jun. 19, 2003

(30) Foreign Application Priority Data

Dec. 19, 2001    (KR) ............................... 2001-81121

(51) Int. Cl.
*G10L 19/00* (2006.01)
*G10L 19/14* (2006.01)
*G10L 21/00* (2006.01)
*G06F 15/173* (2006.01)

(52) U.S. Cl. ................. 704/201; 704/205; 704/500; 709/238

(58) Field of Classification Search .................... None
See application file for complete search history.

(56) References Cited

U.S. PATENT DOCUMENTS

| | | | |
|---|---|---|---|
| 4,034,160 A | * | 7/1977 | Van Gerwen ............... 704/201 |
| 5,068,899 A | | 11/1991 | Ellis et al. |
| 5,222,080 A | * | 6/1993 | Wang et al. ................. 370/422 |
| 5,875,246 A | * | 2/1999 | Houghton ............... 379/406.05 |

(Continued)

FOREIGN PATENT DOCUMENTS

KR    10-2000-0073406    12/2000

(Continued)

OTHER PUBLICATIONS

Iscra et al., "A Congestion Control Scheme for a Robust Audio Streaming Service Over a Best-Effort Network", 2001 International Symposium on Performance Evaluation of Computer and Telecommunication Systems, Jul. 15-18, 2001, Orlando, FL.*

(Continued)

*Primary Examiner*—David Hudspeth
*Assistant Examiner*—Brian L. Albertalli
(74) *Attorney, Agent, or Firm*—Staas & Halsey LLP

(57) ABSTRACT

A method and an apparatus for transmitting a speech signal are provided. A speech signal transmitter includes a quadrature mirror filter, a base sub-band encoder, an enhancement sub-band encoder, and a network connector. The quadrature mirror filter receives a speech signal, divides the speech signal into an enhancement band speech signal and a base band speech signal, and outputs the enhancement band speech signal and the base band speech signal. The base sub-band encoder receives and encodes the base band speech signal. The enhancement sub-band encoder receives and encodes the enhancement band speech signal. The network connector multiplexes the encoded enhancement band speech signal and the encoder base band speech signal based on the kinds of networks over which speech signals are transmitted, and transmits the multiplexed signals to the networks. A speech signal s multiplexed and transmitted by various methods based on the kinds of networks. Thus, the speech signal can be efficiently transmitted.

12 Claims, 8 Drawing Sheets

U.S. PATENT DOCUMENTS

| | | | |
|---|---|---|---|
| 6,438,134 B1 * | 8/2002 | Chow et al. | 370/412 |
| 6,526,384 B1 * | 2/2003 | Mueller et al. | 704/501 |
| 6,574,213 B1 * | 6/2003 | Anandakumar et al. | 370/349 |
| 2001/0053149 A1 * | 12/2001 | Mo et al. | 370/389 |

FOREIGN PATENT DOCUMENTS

| KR | 2001-0050633 | 6/2001 |
|---|---|---|

OTHER PUBLICATIONS

Esteban et al., "Application of quadrature mirror filters to split band voice coding schemes", ICASSP '77, May 1977, vol. 2, pp. 191-195.*

1997 IEEE Tencon, "Mixed Wideband Speech and Music Coding Using a Speech/Music Discriminator", R. Qiao, 4 pages.

* cited by examiner

METHOD AND APPARATUS FOR TRANSMITTING WIDEBAND SPEECH SIGNALS

BACKGROUND OF THE INVENTION

1. Field of the Invention

The present invention relates to a method and an apparatus for transmitting speech signals, and more particularly, to a method and an apparatus for wideband encoding of speech signals and transmission of the encoded bit stream.

2. Description of the Related Art

Conventionally, various coding methods have been proposed to digitize and process speech signals. General speech signal processing methods are classified into two types: in one, 16 bit linear pulse code modulation data is obtained by sampling input analog speech signals at 8 kHz and input to an encoder; in the other, 16 bit linear pulse code modulation data is obtained by sampling input analog speech signals at 16 kHz and input to an encoder. In the former method, speech signals are coded by methods including G.711–G.712 pulse code modulation (PCM) and G.720–G.729 non-PCM standards of the International Telecommunication Union—Telecommunication Standardization Sector (ITU-T). In the latter method, speech signals are coded by G.722 and G.722.1 of the ITU-T and an adaptive multi-rate wideband (AMR-WB) method, which will be used in IMT-2000.

Here, G.723.1, which is a standard for compressing multimedia signals at a lower rate, is an algorithm for compressing and restoring input speech at a dual rate of 5.3/6.3 kbit/s and provides toll quality on a cable network. G.723.1 uses a Hybrid coding technique combining a waveform coding method and a parametric coding method, and is a Code Excited Linear Prediction (CELP)-based speech coder. G. 729, which is a standard for IMT-2000 to expand the frequency efficiency for mobile communications, is an algorithm for compressing and restoring input speech at a rate of 8 kbit/s. G.729A is reduced complexity version of the G.729 coder. This version is bitstream interoperable with the full version.

G.729A also provides toll quality on a cable network and uses a Hybrid coding technique and a CELP-based speech coder. ITU-T G.722, which is a standard for coding wideband audio signals, has a transmission rate of 64, 56, or 48 kbit/s and face-to-face communication quality. Also, G.722 divides one band into two sub-bands and codes each of the two sub-bands, using an Adaptive Differential Pulse Code Modulation (AD-PCM) method.

Methods and apparatuses for providing toll quality on a cable network and coding speech at a lower rate have enabled new services in mobile communications and telephony due to high frequency efficiency. In particular, the services using Voice over Internet Protocol (VoIP) over Internet networks are rapidly becoming widespread because of their low telephone rates. However, conventional coding methods and apparatuses have the problem of low service quality due to low toll quality and long delay over Internet networks. Thus, the conventional coding methods and apparatuses do not have a good reputation.

Accordingly, in order to solve these problems, various attempts have been made. For example, if speech signals are sampled at a frequency of 16 kHz in a VoIP system before coding, the quality of the speech signals may be much improved. However, current 16 kHz wideband speech codecs are not at all compatible with the codec currently used in the VoIP service. Thus, a new system is needed. Also, since wideband signals have a wide frequency bandwidth, networks with a large data processing capacity are needed. Thus, starting new services in disregard of current systems has many difficulties.

SUMMARY OF THE INVENTION

To solve the above-described problems, it is a first object of the present invention to provide a speech signal transmitter which is compatible with a conventional system and provides high quality wideband speech signals.

It is a second object of the present invention to provide a speech signal receiver which is compatible with a conventional system and provides high quality wideband speech signals.

It is a third object of the present invention to provide a method of transmitting speech signals which is compatible with a conventional system and provides high quality wideband speech signals.

It is a fourth object of the present invention to provide a method of receiving speech signals which is compatible with a conventional system and provides high quality wideband speech signals.

Accordingly, to achieve the first object, there is provided a speech signal transmitter including a quadrature mirror filter, a base sub-band encoder, an enhancement sub-band encoder, and a network connector. The quadrature mirror filter receives a speech signal, divides the speech signal into an enhancement band speech signal and a base band speech signal, and outputs the enhancement band speech signal and the base band speech signal. The base sub-band encoder receives and encodes the base band speech signal. The enhancement sub-band encoder receives and encodes the enhancement band speech signal. The network connector multiplexes the encoded enhancement band speech signal and the encoded base band speech signal based on the kinds of networks over which speech signals are transmitted, and transmits the multiplexed signals to the networks. The base sub-band encoder encodes the base band speech signal based on G.723.1 or G.729A. The network connector simultaneously packets the enhancement band speech signal and the base band speech signal or packets only the base band speech signal, if the networks are composed only of networks guaranteeing or of networks not guaranteeing quality of service, and packets and transmits the base band speech signal to the networks guaranteeing quality of service and packets and transmits the enhancement band speech signal to the networks not guaranteeing quality of service, if the networks are composed of networks guaranteeing quality of service and networks not guaranteeing quality of service. The speech signal has a sampling frequency of 16 kHz and a bandwidth of 0–8 kHz, the enhancement band speech signal has a sampling frequency of 8 kHz and a bandwidth of 4 kHz–8 kHz, and the base band speech signal has a sampling frequency of 8 kHz and a bandwidth of 0–4 kHz. The speech signal transmitter further includes an acoustic echo canceller for receiving the speech signal, canceling echoes from the speech signal, and outputting the speech signal to the quadrature mirror filter.

To achieve the second object, there is provided a speech signal receiver including a network connector, an enhancement sub-band decoder, a base sub-band decoder, and a quadrature mirror filter. The network connector receives a speech signal, within which an enhancement band speech signal and a base band speech signal are multiplexed based on the kinds of networks through which speech signals are transmitted, demultiplexes the multiplexed speech signal, and extracts an enhancement band digital speech signal and a base band digital speech signal. The enhancement sub-band decoder receives and decodes the enhancement band speech signal. The base sub-band decoder receives and decodes the base band speech signal. The quadrature mirror filter synthesizes the decoded enhancement band speech signal and the decoded base band speech signal into a single speech signal. The base sub-band decoder decodes the base band speech signal based on G.723.1 or G.729A. The enhancement band speech signal has a sampling frequency of 8 kHz and a bandwidth of 4–8 kHz, and the base band speech signal has a sampling frequency of 8 kHz and a bandwidth of 0–4 kHz. The speech signal receiver further includes an acoustic echo canceller for canceling echoes from the synthesized single speech signal.

To achieve the third object, there is provided a method of transmitting a speech signal. An analog speech signal is received and converted into a digital speech signal. The digital speech signal is divided into an enhancement band speech signal and a base band speech signal. The enhancement band speech signal and the base band speech signal are separately encoded. The encoded enhancement band speech signal and the encoded base band speech signal are multiplexed based on the kinds of networks to which the speech signal is transmitted, and the multiplexed enhancement band speech signal and the multiplexed base band speech signal are transmitted to the networks. The step of receiving and converting the analog speech signal includes canceling echoes from the digital speech signal. In the step of multiplexing the encoded enhancement band speech signal and the encoded base band speech signal and transmitting the multiplexed enhancement band speech signal and the multiplexed base band speech signal to the networks, if the networks are composed only of networks guaranteeing or of networks not guaranteeing quality of service, then the enhancement band speech signal and the base band speech signal are simultaneously packeted or only the base band speech signal is packeted, and if the networks are composed of networks guaranteeing quality of service and networks not guaranteeing quality of service, the base band speech signal is packeted and transmitted to the networks guaranteeing quality of service and the enhancement band speech signal is packeted and transmitted to the networks not guaranteeing quality of service.

To achieve the fourth object, there is provided a method of receiving a speech signal. A speech signal, within which an enhancement band speech signal and a base band speech signal are multiplexed based on the kinds of networks through which speech signals are transmitted, is received. The multiplexed enhancement band speech signal and the multiplexed base band speech signal are demultiplexed, and an enhancement band digital speech signal and a base band digital speech signal are extracted. The enhancement band digital speech signal and the base band digital speech signal are decoded. The decoded enhancement band digital speech signal and the decoded base band digital speech signal are synthesized into a single speech signal. The step of synthesizing the decoded enhancement band digital speech signal and the decoded base band digital speech signal into a single speech signal includes canceling echoes from the synthesized one speech signal.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, a preferred embodiment of the present invention will be described in detail with reference to the attached drawings.

Figure 1:
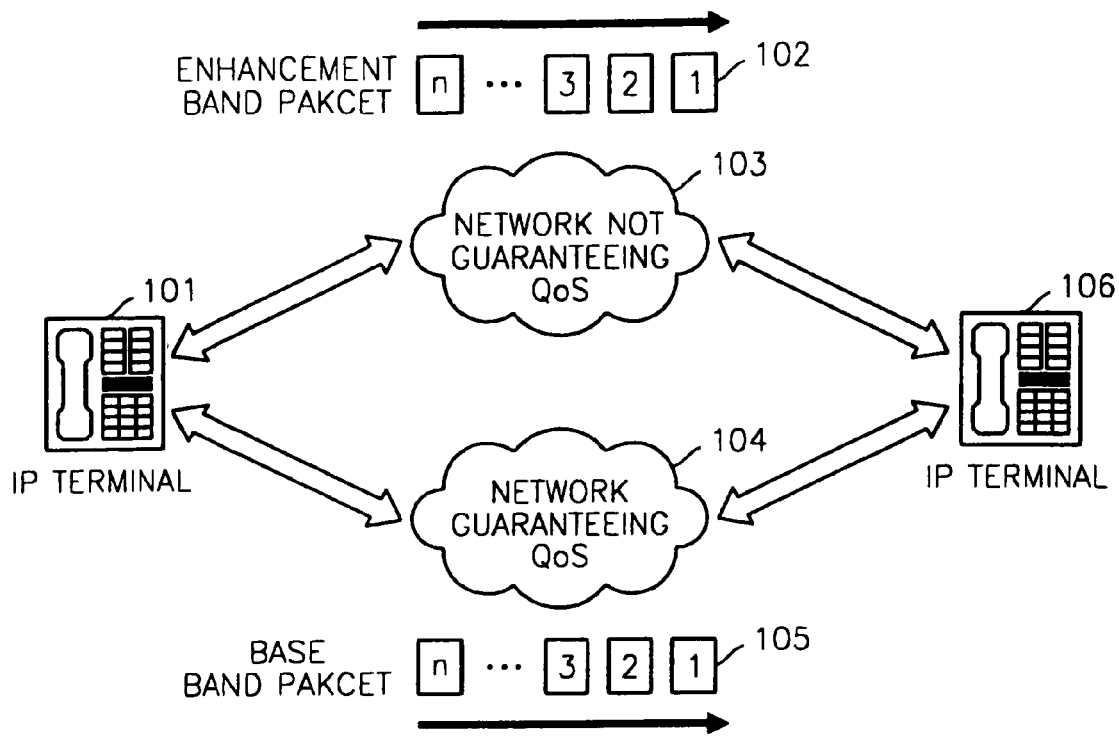
FIG. 1 is a diagram showing a preferred embodiment of the transmission of wideband speech signals via a network according to the present invention.

FIG. 1 is a diagram showing a preferred embodiment of the transmission of a wideband speech signals via a network according to the present invention. Here, a network guaranteeing the quality of service (QoS) and a network not guaranteeing the QoS are simultaneously provided.

Internet Protocol (IP) terminals 101 and 106, which are terminals such as microphones, speakers, and telephones for receiving and outputting speech signals, generate and transmit IP packets. The terminals may have various shapes such as telephone sets or personal computers (PC). When a packet generated in the IP terminal 101 is transmitted to the IP terminal 106, the packet is divided into a base band packet 105 and an enhancement band packet 102. The numbers in packets 102 and 105 represent time stamps. The base band packet 105 has important information on the speech communications and thus is transmitted via a network 104 guaranteeing QoS. If only the base band is used, a person can at least communicate with another person, although the intelligibility and naturalness of their voice is considerably decreased. Thus, if a user wants face-to-face sound quality, the user decodes the enhancement band packet 102 transmitted over the network 103 not guaranteeing the QoS, giving high sound quality. Since a packet transmitted over the network 103 not guaranteeing the QoS has irregular delay, packet error, and jitter, the quality of sound is maximized using a device for improving the QoS such as a jitter buffer and a frame erasure concealment (FEC) device in order to synchronize the packets received by the receiving IP terminal 106.

Figure 2:
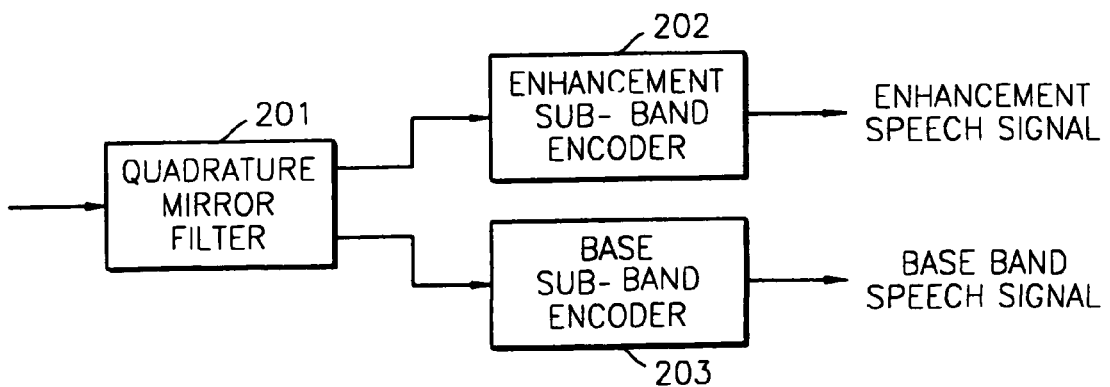
FIG. 2 is a diagram of the structure of a preferred embodiment of a speech signal coder according to the present invention.

FIG. 2 is a diagram of the structure of a preferred embodiment of a speech signal coder according to the present invention. A quadrature mirror filter (QMF) 201 receives a digital speech signal, which is a 16 bit linear pulse code modulation (PCM) signal having a bandwidth of 0–8 kHz sampled at 16 kHz, and outputs a base band signal having a bandwidth of 0–4 kHz sampled at 8 kHz and an enhancement band signal having a bandwidth of 4–8 kHz sampled at 8 kHz. An enhancement sub-band encoder 202 receives and encodes the enhancement band signal using a waveform coding method or a transform coding method, to output an enhancement speech signal. A base sub-band encoder 203 receives and encodes the base band signal according to G.723.1 or G.729A methods, to output a base band speech signal.

Figure 3:
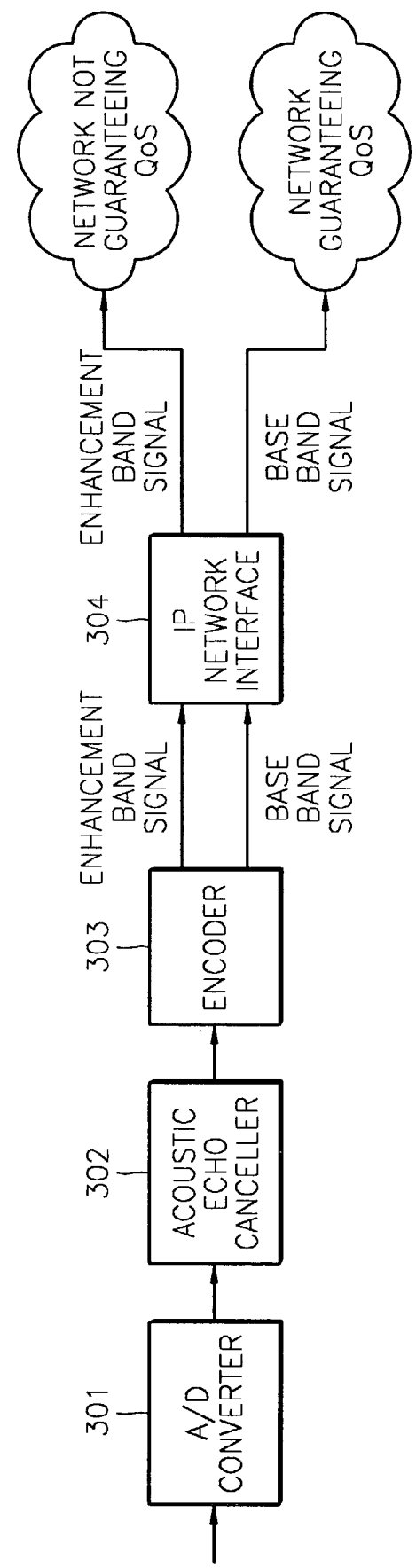
FIG. 3 is a diagram of the structure of a preferred embodiment of a speech signal transmitter according to the present invention.

FIG. 3 is a diagram of the structure of a preferred embodiment of a speech signal transmitter according to the present invention. An A/D converter 301 receives a user's analog speech signal through a microphone and converts the analog speech signal into a digital speech signal.

An acoustic echo canceller 302 cancels echoes from the speech signal received from the A/D converter 301. The acoustic echo canceller 302 may be an acoustic echo canceller according to ITU-T G.167. The signals input into and output from the acoustic echo canceller 302 are 16 bit linear PCM signals sampled at 16 kHz, with a bandwidth of 0–8 kHz.

An encoder 303 receives the signal output from the acoustic echo canceller 302 and separately encodes a base band signal and an enhancement band signal. The detailed structure of the encoder 303 is shown in FIG. 2.

An IP Network Interface 304 multiplexes an input signal composed of a base band and an enhancement band in various ways, according to the structure of the IP Network, to efficiently transmit packets. If all IP networks provided for speech signal communication guarantee the QoS, then the base band signal and the enhancement band signal are simultaneously packeted or only the base band signal is packeted. If a network guaranteeing the QoS and a network not guaranteeing the QoS are simultaneously provided, the relatively important base band signal is transmitted through the network guaranteeing the QoS, and the enhancement band signal is transmitted through the network not guaranteeing the QoS. Here, although packet errors and jitter occur in the network not guaranteeing the QoS, sound quality is higher than when only the base band signal is used. If all the IP networks do not guarantee the QoS, then the base band signal and the enhancement band signal are simultaneously packeted or only the base band signal is packeted.

Figure 9:
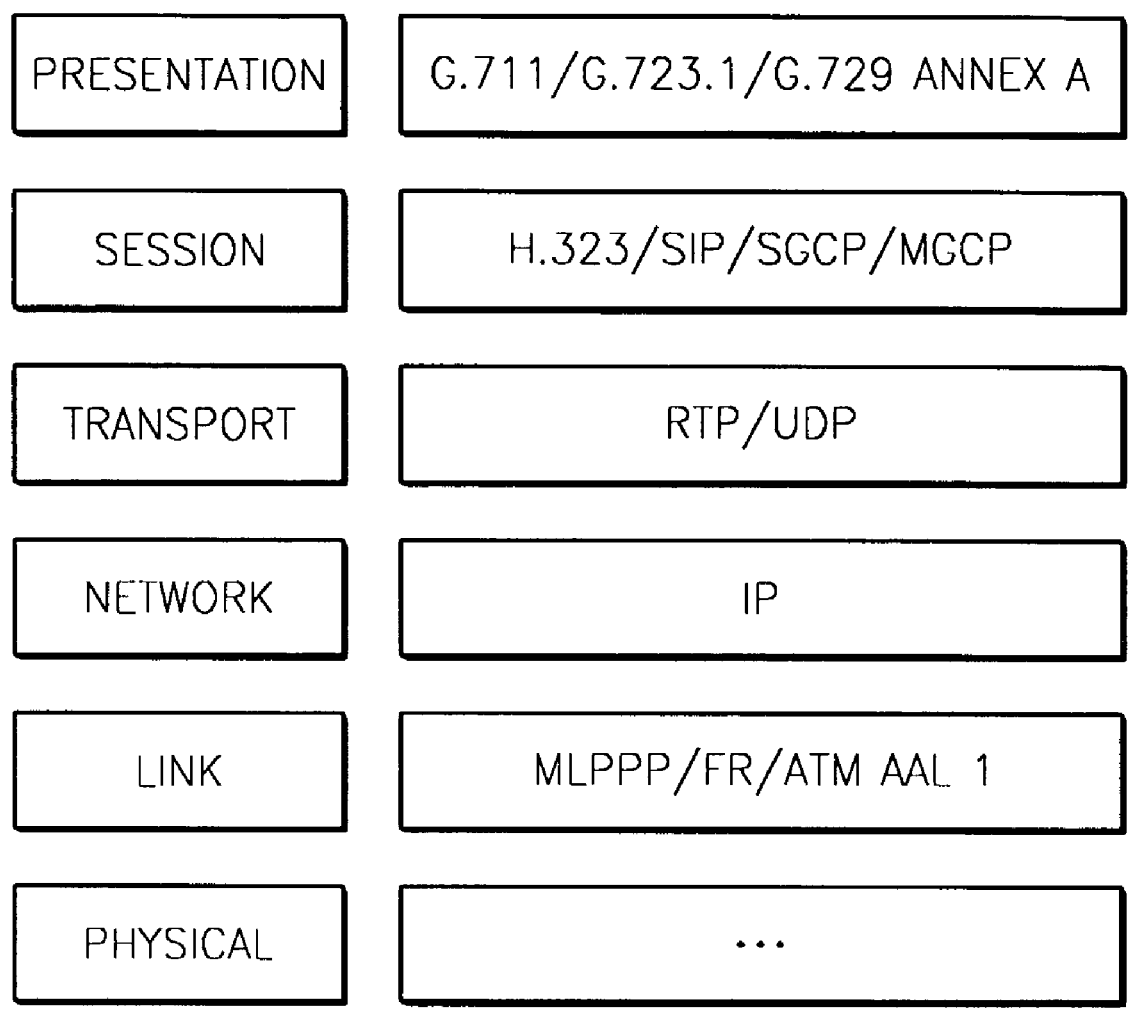
FIG. 9 is a diagram of the structure of a general Voice over Internet Protocol (VoIP) service.

The IP Network Interface 304 generates packets in the form shown in FIG. 9. Currently VoIP is composed of the combination of various protocols, but the present invention may be applied to the combination of any protocols mentioned here.

Figure 4:
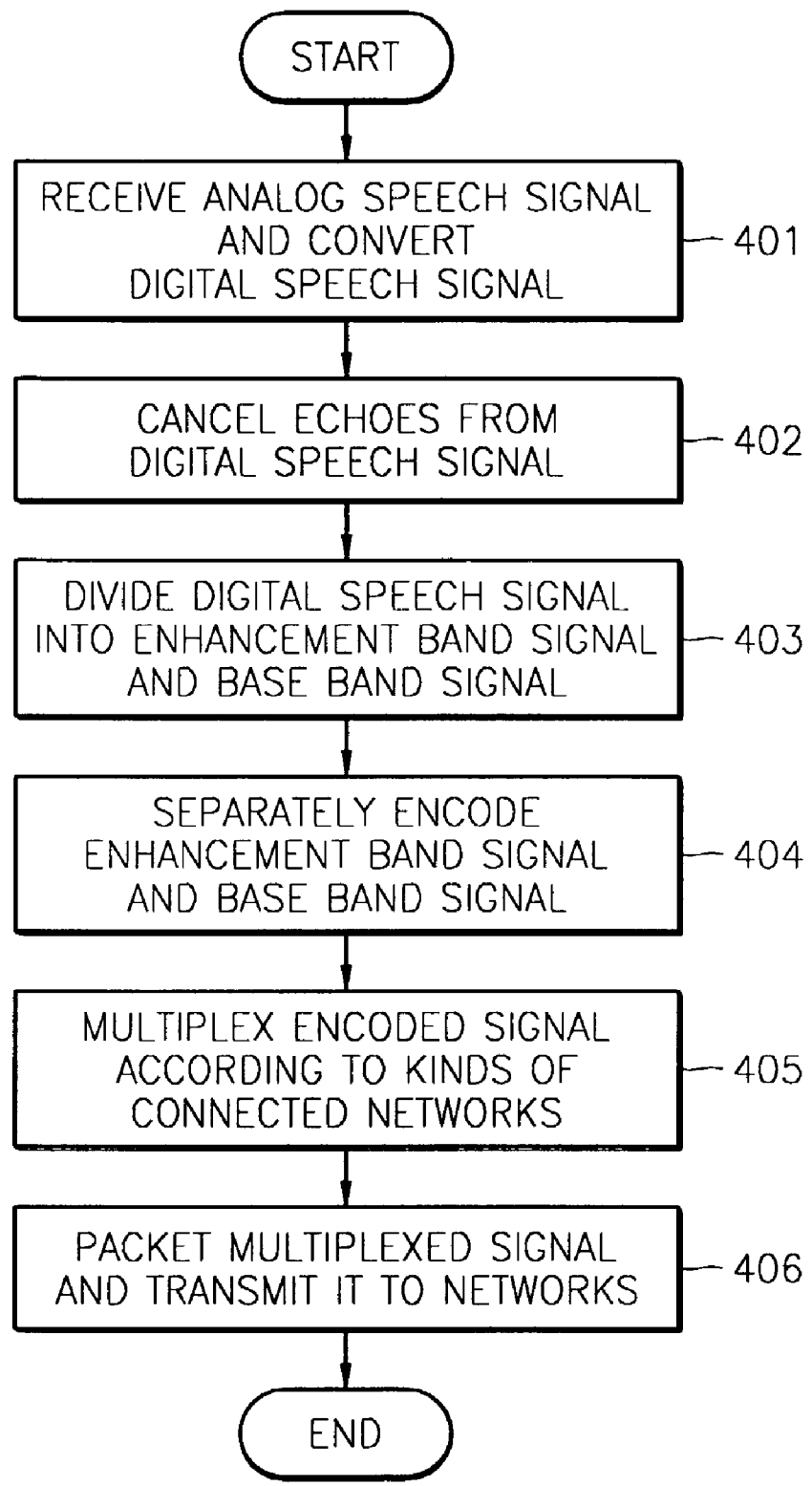
FIG. 4 is a flowchart of a preferred embodiment of a method of transmitting speech signals according to the present invention.

FIG. 4 is a flowchart of a preferred embodiment of a method of transmitting speech signals according to the present invention. An analog speech signal is received and is converted into a digital speech signal in step 401. Echoes are cancelled from the digital speech signal in step 402. The digital speech signal is divided into an enhancement band signal and a base band signal in step 403. The enhancement band signal and the base band signal are separately encoded in step 404. The encoded signal is multiplexed in various combinations according to the kinds of connected networks in step 405. The multiplexed signal is packeted and transmitted to the networks in step 406.

Here, the digital speech signal, into which the analog speech signal is converted, is a 16 bit linear PCM signal sampled at 16 kHz. The base band signal is sampled at 8 kHz and has a bandwidth of 0–4 kHz. The enhancement band signal is sampled at 8 kHz and has a bandwidth of 4–8 kHz. The base band signal may be coded by G.723.1 or G.729A methods. The enhancement band signal may be coded by a waveform coding method or a transform coding method.

Figure 5:
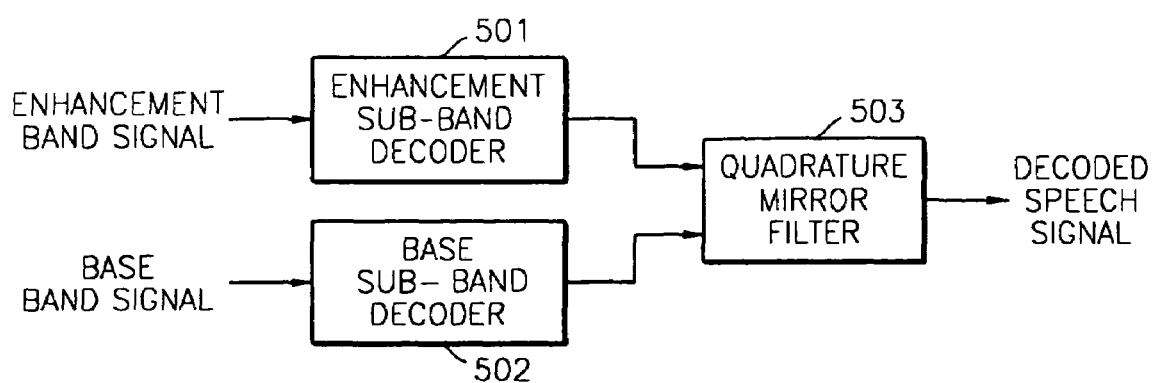
FIG. 5 is a diagram of the structure of a preferred embodiment of a speech signal decoder according to the present invention.

FIG. 5 is a diagram of the structure of a preferred embodiment of a speech signal decoder according to the present invention. An enhancement sub-band decoder 501 receives and decodes a coded enhancement band speech signal using a waveform coding method or a transform coding method, to output an enhancement band speech signal.

A base sub-band decoder 502 receives and decodes a coded base band speech signal according to G.723.1 or G.729A methods, to output a base band speech signal.

A quadrature mirror filter (QMF) 503 receives the enhancement band speech signal and the base band speech signal from the enhancement sub-band decoder 501 and the base sub-band decoder 502. The QMF 503 synthesizes the enhancement band speech signal and the base band speech signal into one speech signal and outputs the one speech signal.

Figure 6:
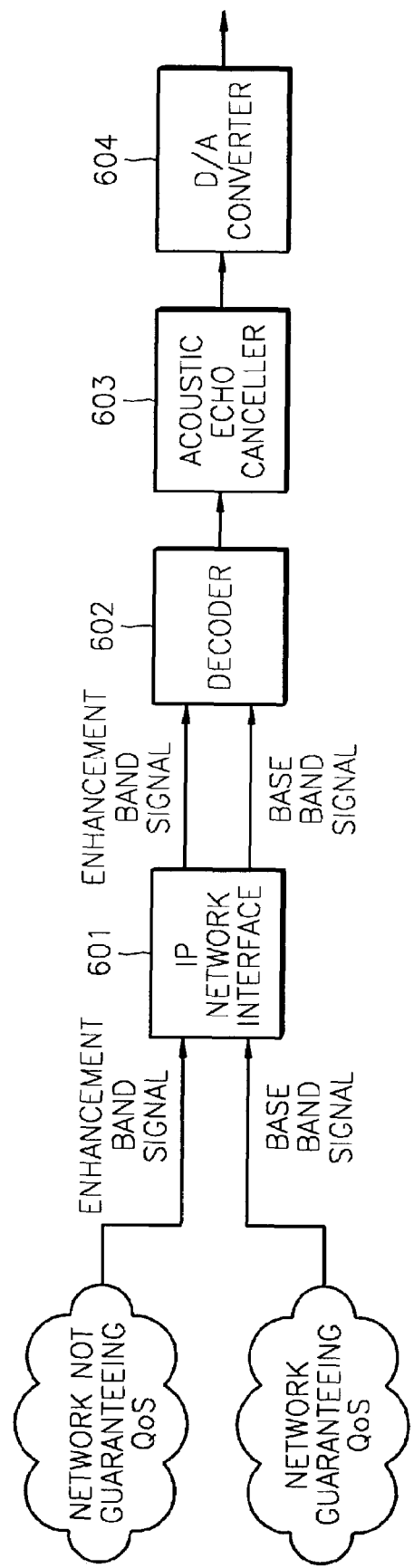
FIG. 6 is a diagram of the structure of a preferred embodiment of a speech signal receiver according to the present invention.

FIG. 6 is a diagram of the structure of a preferred embodiment of a speech signal receiver according to the present invention.

An IP Network Interface 601 receives and demultiplexes a multiplexed base band speech signal and a multiplexed enhancement band speech signal, to extract and output a coded enhancement base speech signal and a coded base band speech signal.

A decoder 602 receives the extracted enhancement band speech signal and base band speech signal from the IP Network Interface 601, decodes them, synthesizes them into one speech signal and outputs the single speech signal. Here, the decoding is the same as the coding described above. The detailed structure of the decoder 602 was described in detail with reference to FIG. 5.

An acoustic echo canceller 603 receives the synthesized speech signal from the decoder 602 and cancels echoes from the synthesized speech signal. The acoustic echo canceller 603 may be an acoustic echo canceller according to ITU-T G.167.

A D/A converter 604 receives the speech signal from which the echoes are cancelled, and converts the speech signal into an analog signal, which is provided to a user via an outputting portion.

Figure 7:
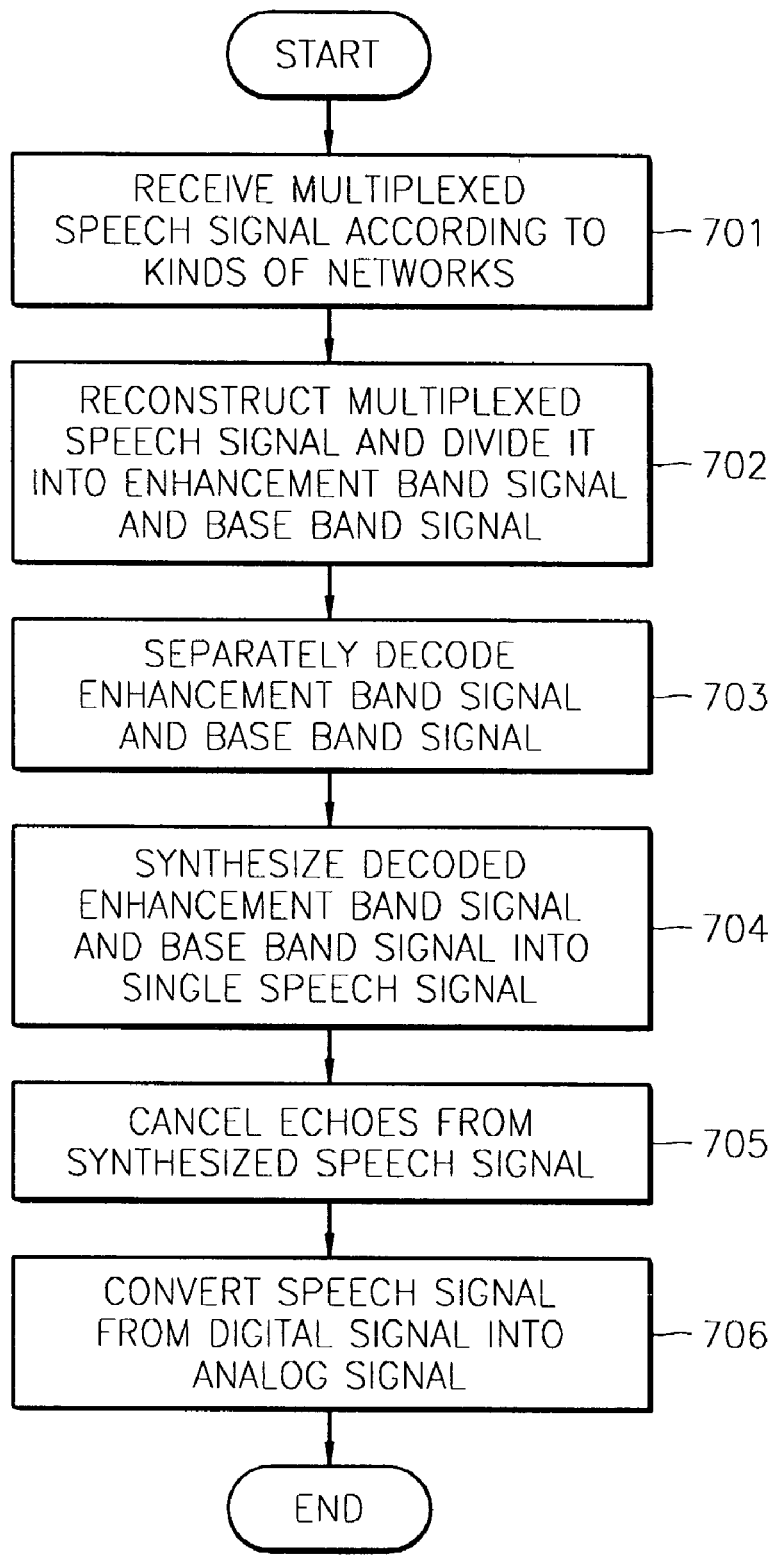
FIG. 7 is a flowchart of a preferred embodiment of a method of receiving speech signals according to the present invention.

FIG. 7 is a flowchart of a preferred embodiment of a method of receiving speech signals according to the present invention. A multiplexed speech signal is received according to the kinds of networks, in step 701. The multiplexed speech signal is demultiplexed and divided into an enhancement band signal and a base band signal, in step 702. The enhancement band signal and the base band signal are separately decoded in step 703. The decoded enhancement band signal and base band signal are synthesized into one speech signal, in step 704. Echoes are cancelled from the synthesized speech signal in step 705. The speech signal is converted from a digital signal into an analog signal in step 706.

A method of decoding the speech signal is the same as the method applied to the decoder and the speech signal receiver described with reference to FIGS. 5 and 6.

Figure 8:
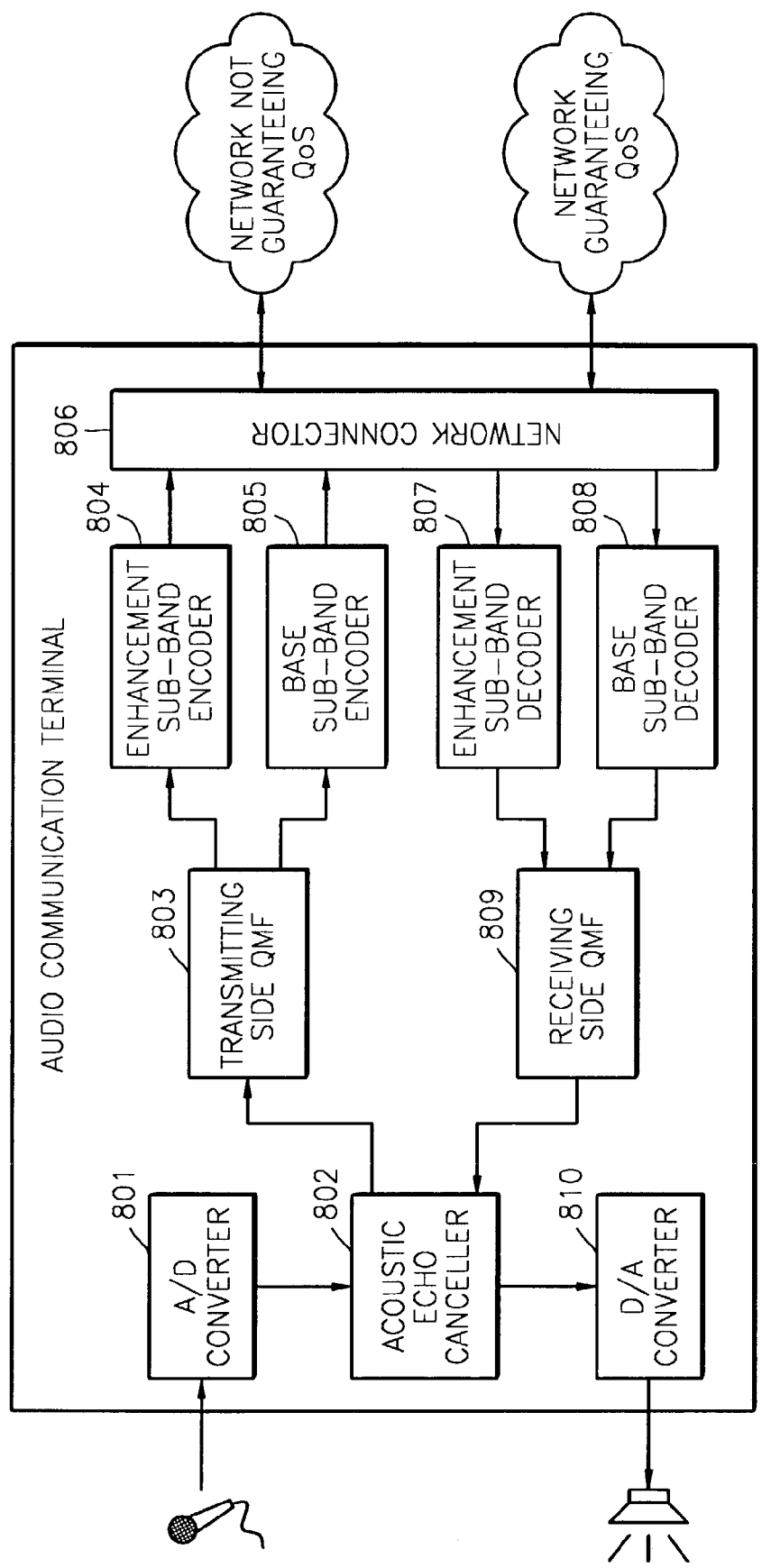
FIG. 8 is a diagram of the structure of a preferred embodiment of an audio communication terminal according to the present invention.

FIG. 8 is a diagram of the structure of a preferred embodiment of an audio communication terminal according to the present invention. Referring to FIG. 8, an A/D converter 801 receives a user's voice as an analog speech signal through a microphone, and converts the analog speech signal into a digital speech signal.

An acoustic echo canceller 802 cancels echoes from the digital speech signal output from the A/D converter 801. The acoustic echo canceller 802 also receives a digital speech signal from a receiving side QMF 809 and cancels echoes from the digital speech signal.

A transmitting side QMF 803 receives a speech signal, from which echoes are cancelled from the user's speech signal, and divides the speech signal into a base band signal having a bandwidth of 0–4 kHz and an enhancement band signal having a bandwidth of 4–8 kHz.

An enhancement sub-band encoder 804 receives the enhancement band signal from the transmitting side QMF 803, codes the enhancement band signal according to a waveform coding method or a transform coding method, and outputs the coded enhancement band signal to a network connector 806.

A base sub-band encoder 805 receives the base band signal from the transmitting side QMF 803, codes the base band signal according to G.723.1 or G.729A methods, and outputs the coded base band signal to the network connector 806.

The network connector 806 receives the coded enhancement band signal and base band signal from the enhancement sub-band encoder 804 and the base sub-band encoder 805, multiplexes the coded enhancement band signal and base band signal, and transmits the multiplexed signal to the networks the enhancement band signal and the base band signal, which are the speech signals, are combined and multiplexed according to the kinds of networks to which the speech signal is transmitted. In other words, if all IP networks provided for the communication of speech signals guarantee the QoS, the enhancement band signal and the base band signal are simultaneously packeted or only the base band signal is packeted. When a network guaranteeing the QoS and a network not guaranteeing the QoS are simultaneously provided, the relatively important base band signal is transmitted to the network guaranteeing the QoS, and the enhancement band signal is transmitted to the network not guaranteeing the QoS. Here, although packet errors and jitter occur in the network not guaranteeing the QoS, sound quality is higher than when only the base band signal is used. If all the IP networks do not guarantee the QoS, the base band signal and the enhancement band signal may be simultaneously packeted or only the base band signal may be packeted.

The network connector 806 receives and demultiplexes a signal, from the multiplexed base band signal or the enhancement band signal, based on the kinds of networks, and extracts and outputs a coded enhancement band speech signal and base band speech signal.

An enhancement sub-band decoder 807 receives the extracted enhancement band speech signal from the network connector 806 and decodes the extracted enhancement band speech signal according to a waveform coding method or a transform coding method.

A base sub-band decoder 808 receives the extracted enhancement band speech signal from the network connector 806 and decodes the extracted enhancement band speech signal according to G.723.1 or G.729A methods.

A receiving side QMF 809 receives the decoded speech signals from the enhancement sub-band decoder 807 and the base sub-band decoder 808, synthesizes the decoded speech signals into one speech signal, and outputs the single speech signal to the acoustic echo canceller 802.

A D/A converter 810 receives a speech signal, from which echoes are cancelled, from the acoustic echo canceller 802 and converts the speech signal into an analog speech signal. The analog speech signal may be provided to a user via a speech signal outputting device.

Here, a digital speech signal, into which an analog speech signal is converted, is a 16 bit linear PCM signal sampled at 16 kHz. The base band signal is sampled at 8 kHz and has a bandwidth of 0–4 kHz. The enhancement band signal is sampled at 8 kHz and has a bandwidth of 4–8 kHz.

According to the present invention, if a user selects only a base band signal, the base band signal is compatible with a currently provided coding method. Thus, a new system is unnecessary. If an enhancement band signal is also used, speech communication of high quality is possible. Also, speech signals are multiplexed based on the kinds of provided networks. Thus, the speech signals can be efficiently transmitted. Moreover, echoes are cancelled from the speech signals to allow the use of a loud speaker, giving high quality live sound. Thus, better communication environment can be provided.

Also, according to the present invention, it is possible to realize computer-readable codes in computer-readable recording media. The computer-readable recording media include all kinds of recording devices storing computer-readable data. In other words, the computer-readable media include ROM, RAM, CD-ROM, magnetic tapes, floppy disks, optical data storing devices, and the like. Moreover, the computer-readable recording media can be dispersed to computer systems connected to each other via networks, stored as computer-readable codes and executed.

While this invention has been particularly shown and described with reference to preferred embodiments thereof, it will be understood by those skilled in the art that various changes in form and details may be made therein without departing from the spirit and scope of the invention as defined by the appended claims. Therefore, disclosed embodiments must be considered in view of description not limitation. The scope of the present invention is shown in claims not in the description and all differences in the range equal to the scope of the present invention are construed as being included in the present invention.

What is claimed is:

1. A speech signal transmitter comprising:
   a quadrature mirror filter for receiving a speech signal, dividing the speech signal into an enhancement band speech signal and a base band speech signal, and outputting the enhancement band speech signal and the base band speech signal;
   a base sub-band encoder for receiving and encoding the base band speech signal;
   an enhancement sub-band encoder for receiving and encoding the enhancement band speech signal; and
   a network connector for multiplexing the encoded enhancement band speech signal and the encoded base band speech signal based on the kinds of networks over which speech signals are transmitted, and transmitting the multiplexed signals to the networks,
   wherein the network connector simultaneously packets the enhancement band speech signal and the base band speech signal or packets only the base band speech signal, if the networks are composed only of networks guaranteeing or of networks not guaranteeing quality of service, and packets and transmits the base band speech signal to the networks guaranteeing quality of service and packets and transmits the enhancement band speech signal to the networks not guaranteeing quality of service, if the networks are composed of networks guaranteeing quality of service and networks not guaranteeing quality of service.

2. The speech signal transmitter of claim 1, wherein the base sub-band encoder encodes the base band speech signal based on 6.723.1 or G.729A.

3. The speech signal transmitter of claim 1, wherein the speech signal has a sampling frequency of 16 kHz and a bandwidth of 8 kHz, the enhancement band speech signal has a sampling frequency of 8 kHz and a bandwidth of 4 kHz–8 kHz, and the base band speech signal has a sampling frequency of 8 kHz and a bandwidth of 0–4 kHz.

4. The speech signal transmitter of claim 1, further comprising an acoustic echo canceller for receiving the speech signal, canceling echoes from the speech signal, and outputting the speech signal to the quadrature mirror filter.

5. A speech signal receiver comprising:
a network connector for receiving a speech signal, within which an enhancement band speech signal and a base band speech signal are multiplexed based on the kinds of networks through which speech signals are transmitted, demultiplexing the multiplexed speech signal, and extracting an enhancement band digital speech signal and a base band digital speech signal;
an enhancement sub-band decoder for receiving and decoding the enhancement band speech signal;
a base sub-band decoder for receiving and decoding the base band speech signal; and
a quadrature mirror filter for synthesizing the decoded enhancement band speech signal and the decoded base band speech signal into a single speech signal,
wherein the enhancement band speech signal and the base band speech signal are simultaneously packeted or only the base band speech signal is packeted if the networks are composed only of networks quaranteeing or of networks not guaranteeing quality of service, and the base band speech signal is packeted and transmitted to the networks guaranteeing quality of service and the enhancement band speech signal is packeted and transmitted to the networks not guaranteeing quality of service if the networks are composed of networks guaranteeing quality of service and networks not guaranteeing quality of service.

6. The speech signal receiver of claim 5, wherein the base sub-band decoder decodes the base band speech signal based on G.723.1 or G.729A.

7. The speech signal receiver of claim 5, wherein the enhancement band speech signal has a sampling frequency of 8 kHz and a bandwidth of 4–8 kHz, and the base band speech signal has a sampling frequency of 8 kHz and a bandwidth of 0–4 kHz.

8. The speech signal receiver of claim 5, further comprising an acoustic echo canceller for canceling echoes from the synthesized single speech signal.

9. A method of transmitting a speech signal comprising:
(a) receiving an analog speech signal and converting the analog speech signal into a digital speech signal;
(b) dividing the digital speech signal into an enhancement band speech signal and a base band speech signal;
(c) encoding the enhancement band speech signal and the base band speech signal, separately; and
(d) multiplexing the encoded enhancement band speech signal and the encoded base band speech signal, based on the kinds of networks to which the speech signal is transmitted, and transmitting the multiplexed enhancement band speech signal and the multiplexed base band speech signal to the networks,
wherein the enhancement band speech signal and the base band speech signal are simultaneously packeted or only the base band speech signal is packeted if the networks are composed only of networks guaranteeing or of networks not guaranteeing quality of service, and
the base band speech signal is packeted and transmitted to the networks guaranteeing quality of service and the enhancement band speech signal is packeted and transmitted to the networks not guaranteeing quality of service if the networks are composed of networks guaranteeing quality of service and networks not guaranteeing quality of service.

10. The method of claim 9, wherein step (a) comprises canceling echoes from the digital speech signal.

11. A method of receiving a speech signal comprising:
(a) receiving a speech signal, within which an enhancement band speech signal and a base band speech signal are multiplexed based on the kinds of networks through which speech signals are transmitted;
(b) demultiplexing the multiplexed enhancement band speech signal and the multiplexed base band speech signal, and extracting an enhancement band digital speech signal and a base band digital speech signal;
(c) decoding the enhancement band digital speech signal and the base band digital speech signal; and
(d) synthesizing the decoded enhancement band digital speech signal and the decoded base band digital speech signal into a single speech signal,
wherein the enhancement band speech signal and the base band speech signal are simultaneously packeted or only the base band speech signal is packeted if the networks are composed only of networks guaranteeing or of networks not guaranteeing quality of service, and
the base band speech signal is packeted and transmitted to the networks guaranteeing quality of service and the enhancement band speech signal is packeted and transmitted to the networks not guaranteeing quality of service if the networks are composed of networks guaranteeing quality of service and networks not guaranteeing quality of service.

12. The method of claim 11, wherein step (d) comprises canceling echoes from the synthesized one speech signal.

* * * * *